(12) United States Patent
Bork

(10) Patent No.: US 10,285,407 B2
(45) Date of Patent: May 14, 2019

(54) SYSTEM AND METHOD FOR CUTTING A CARCASS

(71) Applicants: G.E. LEBLANC INC., St. Anselme (CA); SFK LEBLANC A/S, Kolding (DK)

(72) Inventor: Thomas F. Bork, Kolding (DK)

(73) Assignees: G.E. LEBLANC INC., St. Anselme, Quebec (CA); SFK LEBLANC A/S, Kolding (DK)

( * ) Notice: Subject to any disclaimer, the term of this patent is extended or adjusted under 35 U.S.C. 154(b) by 0 days.

(21) Appl. No.: 15/749,927

(22) PCT Filed: Aug. 5, 2016

(86) PCT No.: PCT/IB2016/054752
§ 371 (c)(1),
(2) Date: Feb. 2, 2018

(87) PCT Pub. No.: WO2017/021937
PCT Pub. Date: Feb. 9, 2017

(65) Prior Publication Data
US 2018/0220662 A1    Aug. 9, 2018

Related U.S. Application Data

(60) Provisional application No. 62/201,699, filed on Aug. 6, 2015.

(51) Int. Cl.
*A22B 5/00* (2006.01)

(52) U.S. Cl.
CPC .......... *A22B 5/0023* (2013.01); *A22B 5/0029* (2013.01)

(58) Field of Classification Search
CPC ....... A22B 5/00; A22B 5/0017; A22B 5/0023; A22B 5/0035; A22B 5/0047
(Continued)

(56) References Cited

U.S. PATENT DOCUMENTS 2,606,578 A    8/1952 Milton et al.
4,507,822 A *  4/1985 Herubel ................. A22B 5/202
                                                452/160
(Continued)

FOREIGN PATENT DOCUMENTS

WO    2014/025250 A1    2/2014

OTHER PUBLICATIONS

PCT International Search Report and Written Opinion dated Oct. 14, 2016 from corresponding Application No. PCT/IB2016/054752, 11 pages.
(Continued)

*Primary Examiner* — Richard T Price, Jr.
(74) *Attorney, Agent, or Firm* — Dilworth IP, LLC

(57) ABSTRACT

A system and method for cutting a carcass. The system comprises a support assembly (12) movable along a first path and a second path adjacent to a first portion and a second portion of the carcass respectively; a retractable assembly (14) movable between an extended configuration when the support assembly is moved along the first path and a retracted configuration away from the carcass when the support assembly (12) is being moved along the second path; a first cutting tools (16) processing the first portion of the carcass when the support assembly (12) is moved along the first path, and disengaging from the carcass when the retractable assembly (14) is in the retracted position; and a second cutting tool processing the second portion of the carcass when the support assembly (12) is moved along the second path. The first cutting tool (16) is independently and separately movable relatively to movement of the second cutting tool (18).

15 Claims, 8 Drawing Sheets

(58) Field of Classification Search
USPC .................................. 452/149–155, 156, 160
See application file for complete search history.

(56) References Cited

U.S. PATENT DOCUMENTS

| | | | | |
|---|---|---|---|---|
| 4,653,150 | A * | 3/1987 | Leining | A22B 5/205 |
| | | | | 452/160 |
| 5,613,905 | A * | 3/1997 | Van Ochten | A22B 5/0005 |
| | | | | 30/286 |
| 6,027,405 | A * | 2/2000 | Leining | A22B 5/205 |
| | | | | 452/152 |
| 6,050,889 | A * | 4/2000 | Jacobs | A22B 5/0005 |
| | | | | 452/152 |
| 7,261,630 | B2 * | 8/2007 | Krogh | A22B 5/0023 |
| | | | | 452/152 |
| 2012/0017441 | A1 | 1/2012 | Kalajyan | |

OTHER PUBLICATIONS

PCT International Preliminary Report on Patentability dated Jun. 12, 2017 from corresponding Application No. PCT/US2016/054752, 25 pages.

* cited by examiner

SYSTEM AND METHOD FOR CUTTING A CARCASS

FIELD OF THE INVENTION

The invention relates generally to a system and method for cutting a carcass.

BACKGROUND

Different systems exist for automatically cutting the carcasses of slaughtered animals.

One example is WO 2014025250 describes a device and method for automatically processing a carcass of a slaughtered animal suspended from the hind legs. The device includes a rotatable cutting blade for opening an abdominal wall and which is partially shielded. A cleaving blade to split the pubic bone of the carcass is attached to the shield that partially covers the rotatable cutting blade. However, these tools must be cleaned on a regular basis and such cleaning operations can lead to operational downtimes for the device, when the cleaving blade is fixed on the rotatable cutting blade. The device also requires four individual tools which inevitably require more maintenance, higher operational costs and increased possibilities of downtimes. The presence of four individual tools also implies additional weight, thereby requiring the use of a more powerful, and therefore a slower device.

Hence, in light of the aforementioned, there is a need for a system and a method for cutting a carcass which, by virtue of its design and components, would be able to overcome or at least minimize some of the aforementioned prior art problems.

SUMMARY OF THE INVENTION

The object of the present invention is to provide a system and method for cutting a carcass, which by virtue of its design and components, satisfies some of the above-mentioned needs and is thus an improvement over other related carcass cutting systems and methods and/or methods known in the prior art.

In accordance with the present invention, one of the above objects is achieved, as will be easily understood, with a system and method for cutting a carcass, such as the one briefly described herein, and such as the one exemplified in the accompanying drawings.

More particularly, and according to the present invention, there is provided system for cutting a carcass of a slaughtered animal, the system comprising a support assembly mountable to a manipulator system, the support assembly being movable by the manipulator system along a first path extending adjacent to a first portion of the carcass and a second path extending adjacent to a second portion of the carcass; a retractable assembly mounted to the support assembly and selectively movable between an extended configuration towards the carcass when the support assembly is being moved along one of the first or second paths and a retracted configuration away and disengaged from the carcass when the support assembly is being moved along the other one of the first or second paths; one of a first or a second cutting tools mounted to the retractable assembly and configured to process one of the first or second portions of the carcass when the retractable assembly is in the extended position and the support assembly is being moved along one of the first or second paths and configured to disengage from the carcass when the retractable assembly is in the retracted position; and the other one of the first or second cutting tool mounted to the support assembly and configured to process the other one of the first and second portions of the carcass when the support assembly is being moved along the other one of the first and second paths. The first cutting tool is independently and separately movable relatively to movement of the second cutting tool.

In some implementations, the other one of the first and second cutting tools is mounted to the support assembly through an additional retractable assembly. The additional retractable assembly is selectively movable between a retracted configuration away and disengaged from the carcass when the support assembly is being moved along one of the first or second path and an extended configuration towards the carcass when the support assembly is being moved along the other one of the first and second paths.

In some implementations, the retractable assembly and/or the additional retractable assembly is/are movable along a linear axis, a circular path or a combination thereof. The linear axis extends substantially perpendicular to a longitudinal length of the carcass.

In some implementations, the system further comprises a first cleaning tool, configured to clean the first cutting tool during operation of the second cutting tool. The first cleaning tool may be fixed or retractable relatively to the support assembly.

In some implementations, the system further comprises a second cleaning tool configured to clean the second cutting tool during operation of the first cutting tool. The second cleaning tool may be fixed or retractable relatively to the support assembly.

In some implementations, at least one of the first or second cleaning tools is rotatably or linearly movable between a cleaning position towards a corresponding one of the first or second cutting tools and a processing position disengaged from said corresponding one of the first or second cutting tools. The at least one of the first or second cleaning tools is configured to clean said corresponding one of the first or second cutting tool upon positioning in the cleaning position during operation of the other one of the first or second cutting tools.

In some implementations, the first portion of the carcass includes a pubic bone of the carcass and the second portion includes an abdominal wall. The abdominal wall comprises at least one of a belly portion, a brisket portion and throat portion of the carcass. The first cutting tool is configured to cut the first portion, and the second cutting tool is configured to cut the second portion.

In some implementations, the first cutting tool is a cleaving blade and the second cutting tool is a rotatable cutting blade. In some implementations, the system further comprises a blade guard partially covering the rotatable cutting blade. The blade guard may be movable or fixed relatively to the rotatable cutting blade.

In some implementations, the system further comprises a guiding finger extending from an end portion of the blade guard and towards the carcass. The guiding finger may be configured to slide along and behind the abdominal wall during operation of the rotatable cutting blade. The guiding finger may extend tangentially or with an angle relatively to the end portion of the blade guard.

According to the present invention, there is also provided a method of cutting a carcass of a slaughtered animal, the method comprising: extending a first cutting tool towards the carcass; moving the first cutting tool along a first path extending adjacent to a first portion of the carcass to process the first portion of the carcass with the extended first cutting tool; retracting the first cutting tool away and disengaged from the carcass after the first portion has been processed; and moving a second cutting tool along a second path extending adjacent to a second portion of the carcass to process the second portion of the carcass. The first cutting tool is extendable independently and separately relatively to movement of the second cutting tool.

In some implementations, the method further comprises the steps of: extending the second cutting tool towards the carcass before processing the second portion; and retracting the second cutting tool away and disengaged from the carcass after the second portion has been processed.

In some implementations, the first cutting tool is extended along a linear axis, a circular path or a combination thereof, the linear axis extending substantially perpendicular to a longitudinal length of the carcass.

In some implementations, the method further comprises cleaning at least one of the first and second cutting tools after being retracted, and during operation of the other one of the first and second cutting tools.

In some implementations, the method further comprises shielding the second cutting tool during operation of the first cutting tool.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

In the following description, the same numerical references refer to similar elements. The embodiments, geometrical configurations, materials mentioned and/or dimensions shown in the figures or described in the present description are preferred embodiments only, given for exemplification purposes only.

Moreover, although the present invention was primarily designed for cutting carcasses, it may be used for other types of purposes and with other types of objects, and in other fields, as apparent to a person skilled in the art. For this reason, expressions such as "carcass", etc., used herein should not be taken as to limit the scope of the present invention and includes all other kinds of objects or fields with which the present invention could be used and may be useful.

Moreover, in the context of the present invention, the expressions "cleaving blade", "rotatable cutting blade", as well as any other equivalent expressions and/or compounds word thereof known in the art, will be used interchangeably, as apparent to a person skilled in the art.

In addition, although the preferred embodiments of the present invention as illustrated in the accompanying drawings may comprise various components, and although the preferred embodiments of the system as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation thereinbetween, as well as other suitable geometrical configurations may be used for the system and corresponding components according to the present invention, as will be briefly explained hereinafter and as can be easily inferred herefrom by a person skilled in the art, without departing from the scope of the invention.

Having discussed some of the principal components and features of the system according to the present invention, other preferential embodiments will be further discussed hereinbelow.

Figure 1:
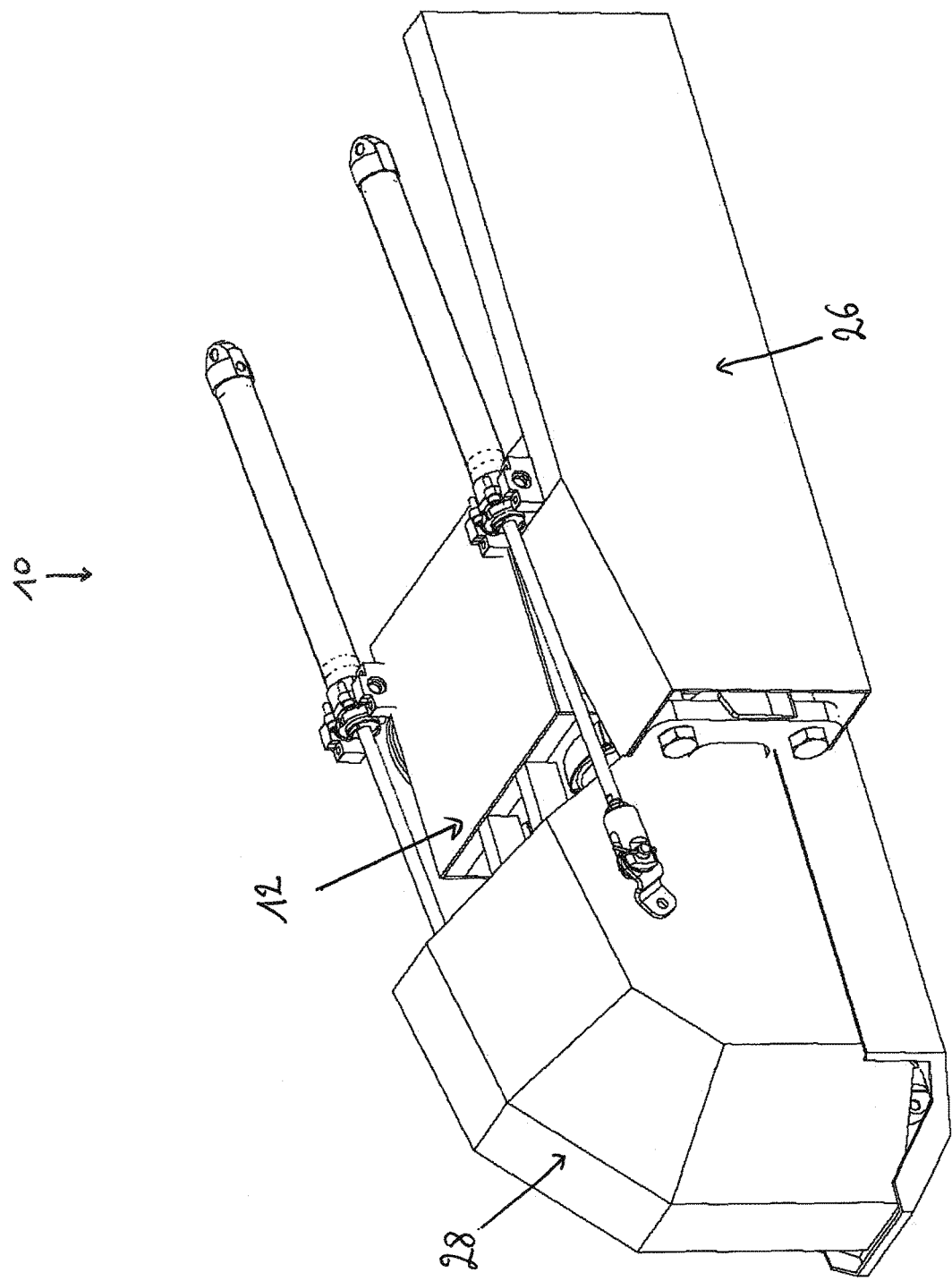
FIG. 1 is a perspective view of a system for cutting a carcass according to an embodiment of the present invention.
Figure 8:
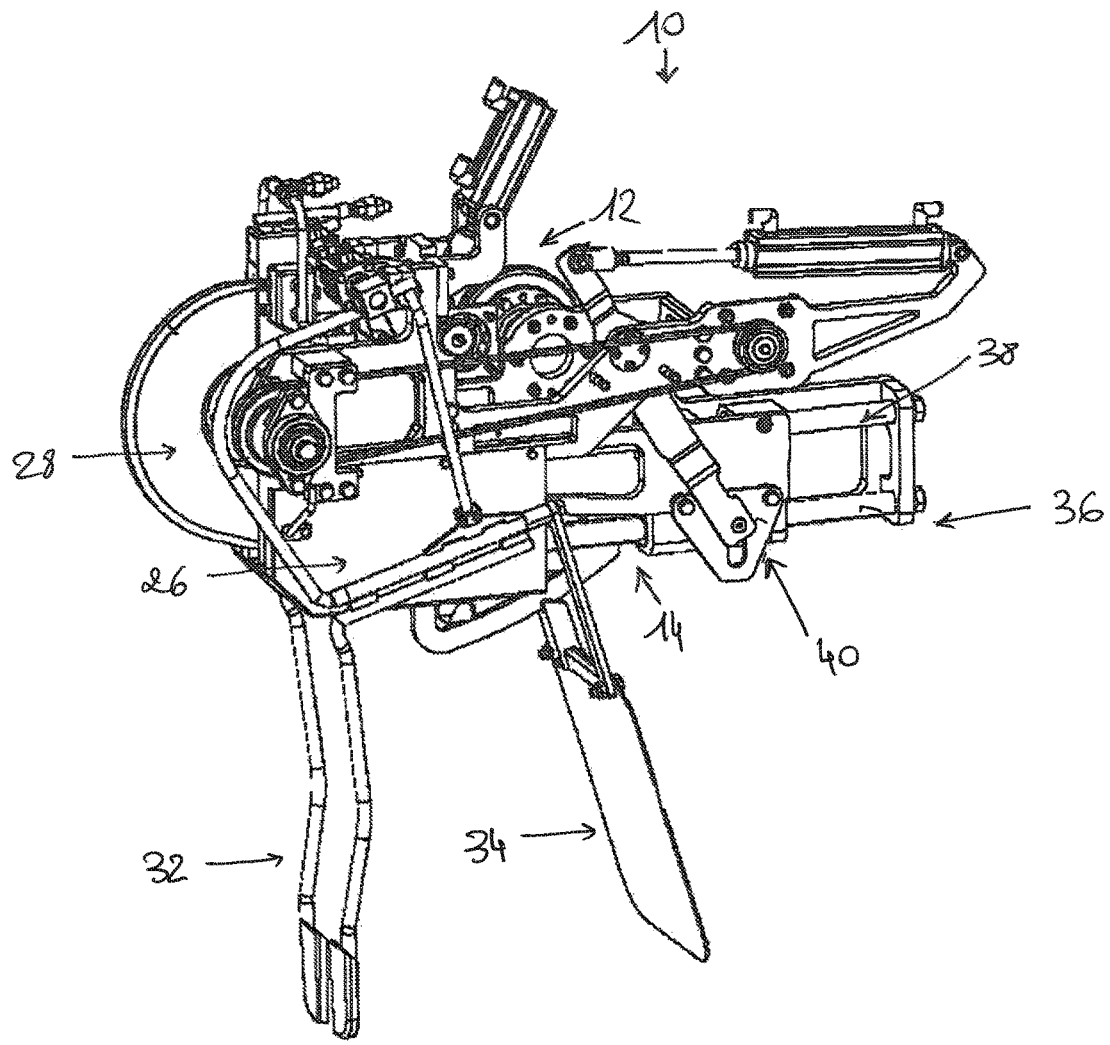
FIG. 8 is a perspective view of the system shown in FIG. 5 with the first cutting tool in a retracted position and the second cutting tool in a shielded configuration.

Referring to FIGS. 1 and 8, a system 10 for cutting a carcass is shown. The system 10 includes a support assembly 12 mountable to a manipulator system. The support assembly 12 is movable by the manipulator system along a first path extending adjacent to a first portion of the carcass and a second path extending adjacent to a second portion of the carcass.

In some implementations, the first portion of the carcass includes a pubic bone of the carcass and the second portion includes an abdominal wall of the carcass. The abdominal wall comprises at least one of a belly portion, a brisket portion and a throat portion of the carcass. In some implementations, the abdominal wall comprises the belly, the brisket and the throat of the carcass. The abdominal wall may also comprise the belly and the brisket of the carcass.

A retractable assembly 14 is mounted to the support assembly 12 and is selectively movable between an extended configuration (better shown in FIGS. 2 and 6) towards the carcass when the support assembly 12 is being moved along the first path and a retracted configuration away and disengaged from the carcass when the support assembly 12 is being moved along the second path.

Figure 2:
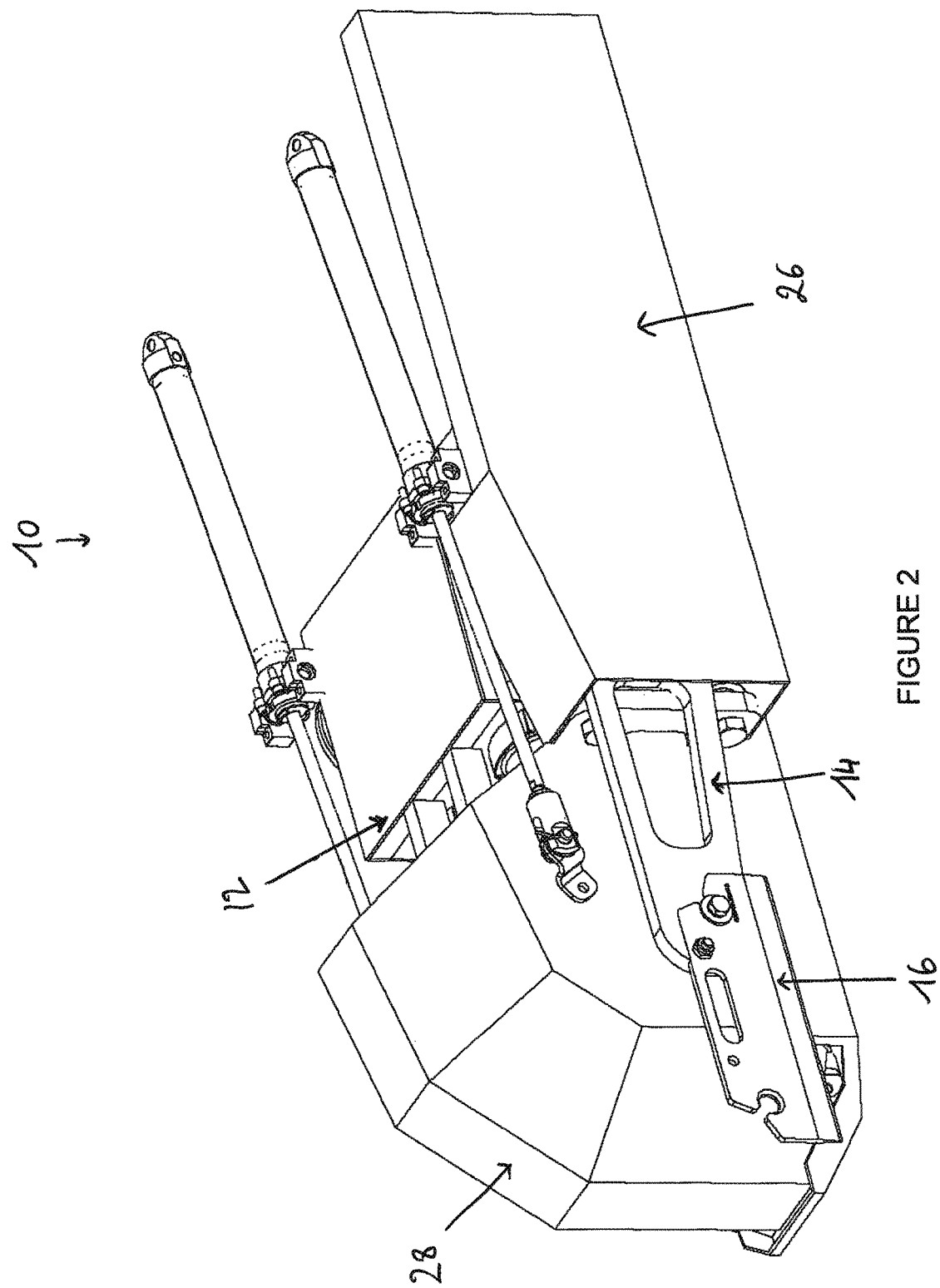
FIG. 2 is a perspective view of the system shown in FIG. 1 with a first cutting tool in an extended position.
Figure 6:
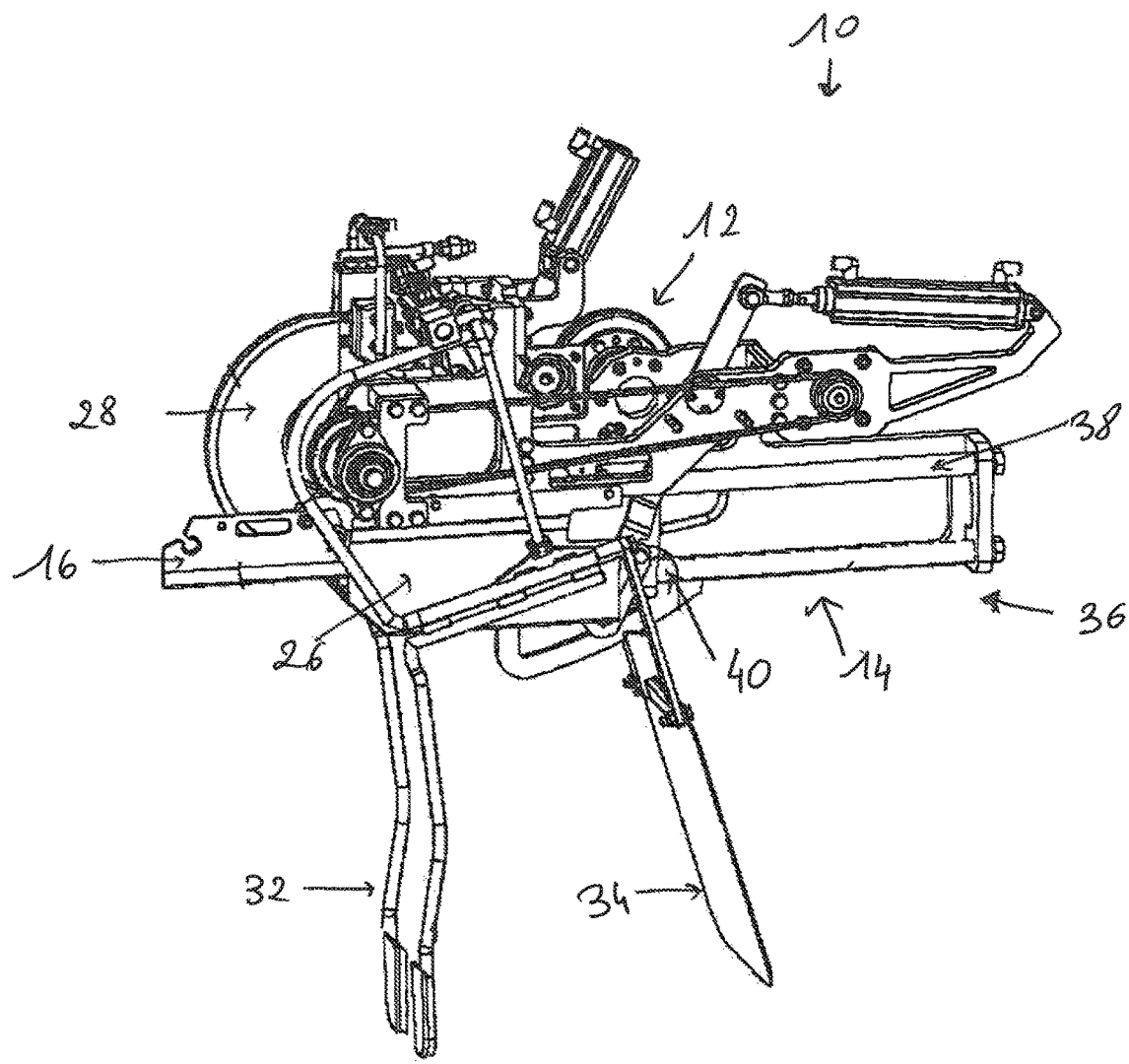
FIG. 6 is a perspective view of the system shown in FIG. 5 with a first cutting tool in an extended position.
Figure 7:
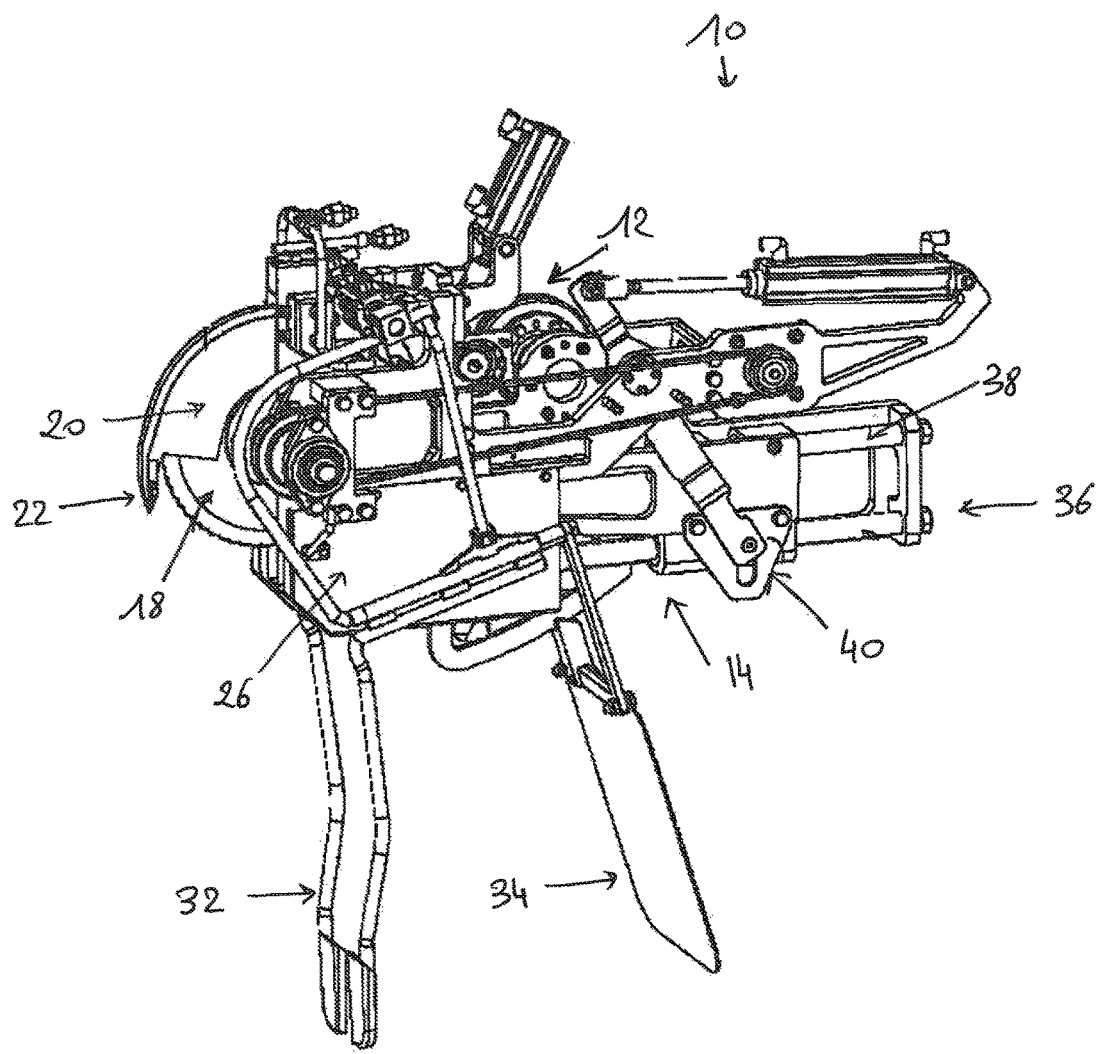
FIG. 7 is a perspective view of the system shown in FIG. 5 with the first cutting tool in a retracted position and the second tool in a cutting position.

In some implementations, and referring to FIGS. 2 and 6, a first cutting tool 16 is mounted to the retractable assembly 14 and configured to process the first portion of the carcass when the retractable assembly 14 is in the extended position and the support assembly 12 is being moved along the first path. The first cutting tool 16 is configured to disengage from the carcass when the retractable assembly 14 is in the retracted position.

Referring to FIGS. 3, 4, 5 and 7, a second cutting tool 18 mounted to the support assembly 12 and configured to process the second portion of the carcass when the support assembly 12 is being moved along the second path.

In some other implementations (not shown), the first cutting tool is mounted to the support assembly and is configured to process the first portion of the carcass when the support assembly is being moved along the first path. The first cutting tool is therefore fixed relatively to the support assembly. In this scenario, the second cutting tool is mounted to the retractable assembly and is configured to process the second portion of the carcass when the retractable assembly is in the extended position and the support assembly is being moved along the second path. The second cutting tool is configured to disengage from the carcass when the retractable assembly is in the retracted position.

In some further implementations (not shown), the system includes an additional retractable assembly mounted on the support assembly. The system therefore comprises first and second retractable assemblies both mounted on the support assembly. The first and the second cutting tools are thus each mounted on one of the first and the second retractable assemblies.

The first retractable assembly is selectively movable between an extended configuration towards the carcass when the support assembly is being moved along the first path and a retracted configuration away and disengaged from the carcass when the support assembly is being moved along the second path. The second retractable assembly is selectively movable between an extended configuration towards the carcass when the support assembly is being moved along the second path and a retracted configuration away and disengaged from the carcass when the support assembly is being moved along the first path.

In this scenario, the first cutting tool is configured to process the first portion of the carcass when the first retractable assembly is in the extended position while the second retractable assembly is in the retracted position, and the support assembly is being moved along the first path. The first cutting tool is configured to disengage from the carcass when the first retractable assembly is in the retracted position. The second cutting tool is configured to process the second portion of the carcass when the second retractable assembly is in the extended position while the first retractable assembly is in the retracted position, and the support assembly is being moved along the second path. The second cutting tool is configured to disengage from the carcass when the second retractable assembly is in the retracted position.

In some implementations, the retractable assembly 14 is movable along a linear axis, a circular path or a combination thereof. Preferably, the retractable assembly 14 is movable along a linear axis. In some implementations, the linear axis extends substantially perpendicular to a longitudinal length of the carcass.

In some further implementations, the additional retractable assembly is movable along a linear axis, a circular path or a combination thereof. Preferably, the additional retractable assembly is movable along a linear axis. In some implementations, the linear axis extends substantially perpendicular to a longitudinal length of the carcass.

In some implementations, the first cutting tool 16 is configured to split the pubic bone of the carcass, and the second cutting tool 18 is configured to cut the abdominal wall. The second cutting tool may be configured to cut the belly, the brisket and the throat of the carcass.

In some implementations, the first cutting tool 16 is a cleaving blade (or a pubic knife or cutter) and the second cutting tool 18 is a rotatable cutting blade (a circular saw for example).

In some implementations, the system 10 further comprises a blade guard 20 shielding the rotatable cutting blade (or circular saw). Referring to FIGS. 3, 4, 5 and 7, the blade guard 20 partially covers the rotatable cutting blade. The system 10 may further comprise a guiding finger 22 extending from the end of the blade guard 20. The guiding finger 22 engages and slides behind the abdominal wall, i.e. between the skin of the carcass and the internal organs, and allows pulling and tensioning the abdominal wall to improve the performance of the rotatable cutting blade and further limit damaging of the internal organs.

The guiding finger 22 may extend tangentially or with an angle relatively to the end portion of the blade guard 20. When tilted with an angle, the guiding finger 22 provides better cutting performances during operation of the rotatable cutting blade.

Figure 3:
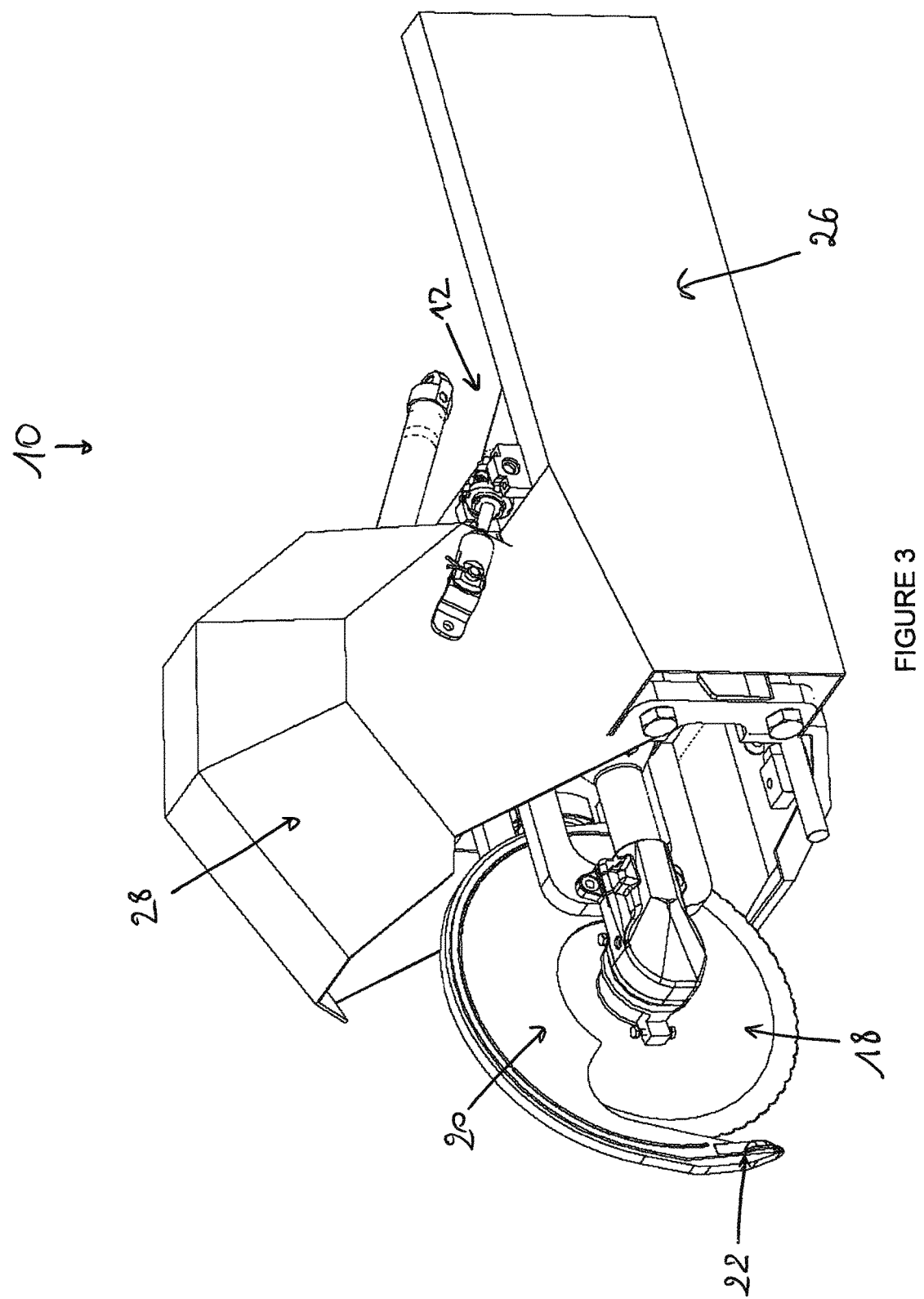
FIG. 3 is a perspective view of the system shown in FIG. 1 with the first cutting tool in a retracted position and a second cutting tool in a cutting position, and a blade guard in a first position.
Figure 4:
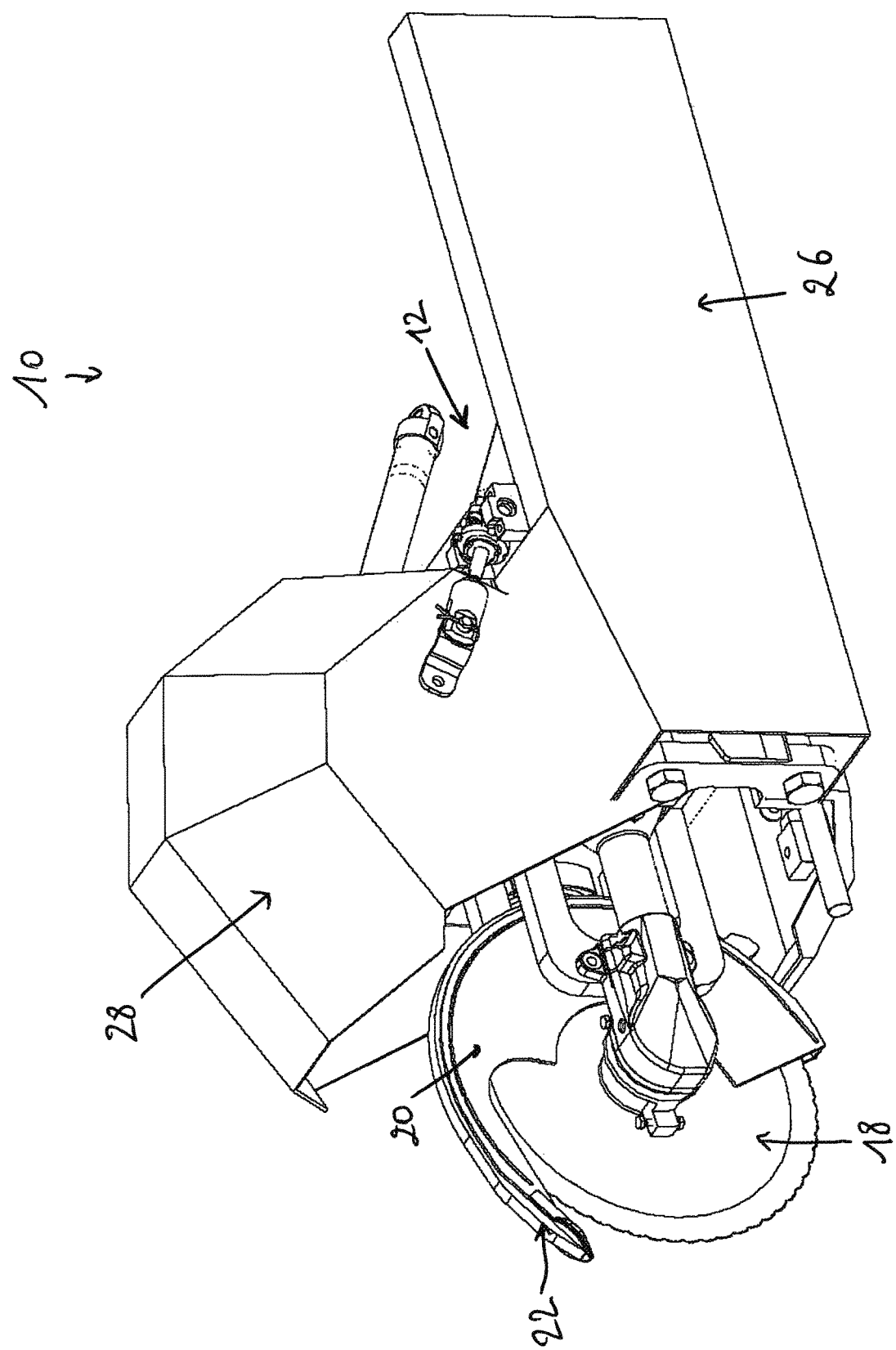
FIG. 4 is a perspective view of the system shown in FIG. 1 with the first cutting tool in a retracted position and a second cutting tool in a cutting position, and a blade guard in a second position.
Figure 5:
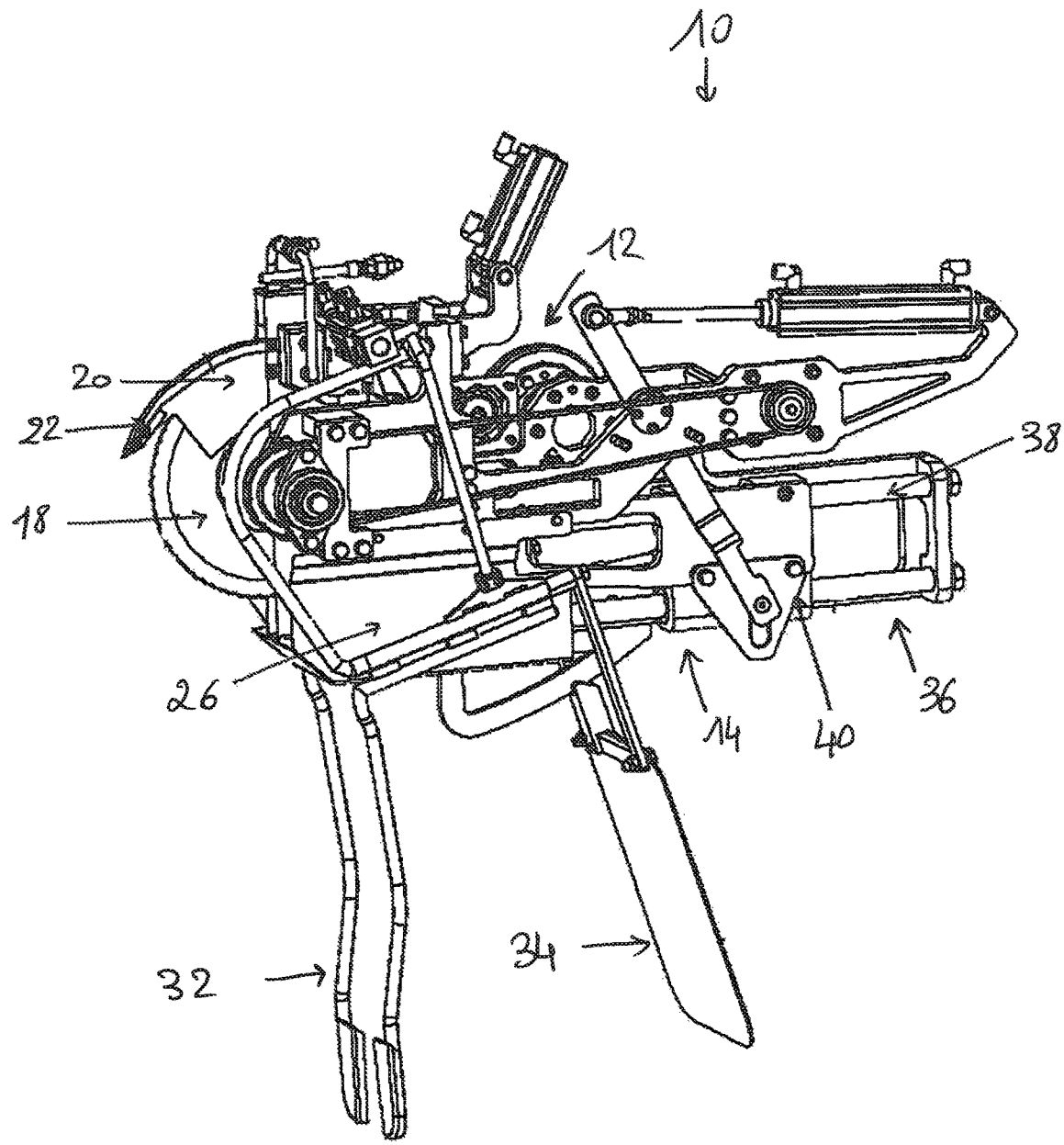
FIG. 5 is a perspective view of a system for cutting a carcass according to another embodiment of the present invention.

In some implementations, the blade guard 20 is selectively movable between a first position, illustrated in FIG. 3 and wherein the guiding finger 22 is engaged behind the abdominal wall, and a second position, illustrated in FIG. 4 and wherein the guiding finger 22 is disengaged from the abdominal wall. In the first position, the rotatable cutting blade processes the carcass along the second path and is allowed to cut the belly of the carcass. In the second position, the guiding finger 22 is disengaged and the rotatable cutting blade is allowed to cut the brisket and the throat of the carcass. The guiding finger is disengaged from behind the abdominal wall by rotation of the blade guard or swivelling of one of the support assembly, retractable assembly and additional retractable assembly comprising the blade guard fixed on the second cutting tool. The skilled addressee will appreciate that the blade guard may be movable between more than the first and second positions.

In some implementations, the blade guard 20 is fixed relatively to the rotatable cutting blade. In this scenario the rotatable cutting blade is pivotable relatively to the support assembly 12. Therefore, after having cut the belly portion of the carcass along the abdominal wall, one of the support assembly, retractable assembly and additional retractable assembly, which comprises the blade guard fixed on the rotatable cutting blade, is pivoted to allow the guiding finger to disengage from behind the abdominal wall, and the rotatable cutting blade is able to cut the brisket and throat portion of the carcass.

In some implementations, the first cutting tool 16 and the second cutting tool 18 are provided horizontally adjacent to one another. The first cutting tool 16 and the second cutting tool may also be provided horizontally and centered with respect to each other (i.e. superposed one above the other). In an implementation, the first cutting tool 16 is a cleaving blade, the second cutting tool is a rotatable cutting blade. The cleaving blade may be adjacent or superposed and centered with respect to the rotatable cutting blade.

In some implementations, a first cleaning tool 26 is configured to clean the first cutting tool 16 upon positioning of the retractable assembly 14 in the retracted position. The first cleaning tool 26 may be retractable or fixed relatively to the support assembly 12. In some implementations, the first cutting tool 16 is mounted on the support assembly 12 (i.e. the first cutting tool 16 is fixed relatively to the support assembly 12), and the first cleaning tool 26 is retractable with regards to the first cutting tool 16. The first cleaning tool 26 is configured to clean the first cutting tool 16 during operation of the second cutting tool, while the support assembly 12 is moved along the second path.

In some implementations, a second cleaning tool 28 is configured to clean the second cutting tool 18 during operation of the first cutting tool 16. The second cleaning tool 28 may be retractable or fixed relatively to the support assembly 12. In some implementations, the second cutting tool is mounted on the support assembly 12 (i.e. the second cutting tool is fixed relatively to the support assembly 12), and the second cleaning tool 28 is retractable with regards to the second cutting tool. The second cleaning tool 28 is configured to clean the second cutting tool during operation of the first cutting tool 16, while the support assembly 12 is moved along the first path.

The first cleaning tool 26 may be rotatably or linearly movable between a cleaning position and a processing position. In the cleaning position, the first cleaning tool 26 is positioned towards the first cutting tool 16, and in the processing position the first cleaning tool 26 is disengaged from the first cutting tool 16, thereby allowing the first cutting tool 16 to process the carcass. The first cleaning tool 26 is configured to clean the first cutting tool upon positioning in the cleaning position during operation of the second cutting tool 18.

The second cleaning tool 28 may be rotatably or linearly movable between a cleaning position and a processing position. In the cleaning position the second cleaning tool 28 is positioned towards the second cutting tool 18, and in the processing position the second cleaning tool 28 is disengaged from the second cutting tool 18, thereby allowing the second cutting tool 18 to process the carcass. The second cleaning tool 28 is configured to clean the second cutting tool 18 upon positioning in the cleaning position during operation of the first cutting tool 16. The second cleaning tool 28 may be a retractable cleaning cover.

In some implementations, the system 10 further includes leg guides 32 and additional protective shielding 34 to control spatter resulting from cutting of the carcass.

In some implementations, the retractable assembly 14 includes a guide assembly 36. The guide assembly 36 includes at least one guide rail 38 extending along the linear axis. A guide 40 is slidably mounted to the at least one guide rail 38, and the guide 40 is being operatively connected to the first cutting tool 16 or to the second cutting tool 18. In some implementation, the additional retractable assembly 14 also comprises a guide assembly 36 such as described above.

In some implementations, the system 10 can operate in the following repeatable sequence:
1—The manipulator system is on standby with the system 10 in the configuration shown in FIG. 1, wherein the first cutting tool 16 is in a retracted position and the second cutting tool is shielded by the second cleaning tool 28, which may be a cleaning cover for example.
2—The manipulator system then displaces the system 10 towards the carcass and the first cutting tool 16, which may be a cleaving blade (or pubic cutter), is deployed as shown in FIG. 2.
3—The system 10 then initiates cutting of the pubic bone along the first path with the first cutting tool 16, while the second cleaning tool 28 is in a cleaning position, thereby cleaning the second cutting tool.
4—The first cutting tool 16 is retracted and the second cleaning tool 28 is retracted to expose the second cutting tool 18 as shown in FIG. 3. In this configuration, the blade guard 20 is in the first position and the guiding finger 22 is able to engage and slide behind the abdominal wall.
5—The system 10 then initiates cutting of the abdominal wall with the second cutting tool 18, while the first cutting tool 16 is cleaned with the first cleaning tool 26.
6—The blade guard 20 then completes a partial rotation in order to allow the second cutting tool to cut the brisket and/or the throat, as shown in FIG. 4.
7—The system 10 is finally retracted and returns to a standby/stop configuration as shown in FIG. 1.

In some other implementations, wherein the first cutting tool 16 is fixed and the second cutting tool is retractable, the system 10 can operate in the following repeatable sequence:
1—The manipulator system is on standby with the system 10 in a configuration wherein the first cutting tool 16 is in a fixed and extended position and the second cutting tool is in a retracted position and shielded by the second cleaning tool 28, which may be a cleaning cover for example.
2—The manipulator system then displaces the system 10 towards the carcass.
3—The system 10 then initiates cutting of the pubic bone along the first path with the first cutting tool 16, while the second cleaning tool 28 is in a cleaning position, thereby cleaning the second cutting tool.
4—The second cleaning tool 28 is then retracted to expose the second cutting tool which is deployed in the extended position. In this configuration, the blade guard 20 is in the first position and the guiding finger 22 is able to engage and slide behind the abdominal wall.
5—The system 10 then initiates cutting of the abdominal wall with the second cutting tool 18 while the first cutting tool 16 is cleaned with the first cleaning tool 26.
6—The blade guard 20 then completes a partial rotation in order to allow the second cutting tool to cut the brisket and/or the throat.
7—The system 10 is finally retracted and returns to a standby/stop configuration.

In some other implementations, wherein the first cutting tool 16 and the second cutting tool are both retractable relatively to the support assembly 12, the system 10 can operate in the following repeatable sequence:
1—The manipulator system is on standby with the system 10 in a configuration wherein the first cutting tool 16 is in retracted position, and the second cutting tool is in a retracted position and shielded by the second cleaning tool 28 (a cleaning cover for example).
2—The manipulator system then displaces the system 10 towards the carcass and the first cutting tool 16, which may be a cleaving blade (or pubic cutter), is deployed in the extended position.
3—The system 10 then initiates cutting of the pubic bone along the first path with the first cutting tool 16, while the second cleaning tool 28 is in a cleaning position, thereby cleaning the second cutting tool.
4—The first cutting tool 16 is then retracted, the second cleaning tool 28 is retracted to expose the second cutting tool which is deployed in the extended position. In this configuration, the blade guard 20 is in the first position and the guiding finger 22 is able to engage and slide behind the abdominal wall.
5—The system 10 then initiates cutting of the abdominal wall with the second cutting tool 18 while the first cutting tool 16 is cleaned with the first cleaning tool 26.
6—The blade guard 20 then completes a partial rotation in order to allow the second cutting tool to cut the brisket and/or the throat.

7—The system 10 is finally retracted and returns to a standby/stop configuration.

In each of these above-mentioned repeatable sequences, in step 5, the leg guides may be activated shortly after the system 10 initiates cutting of the abdominal wall. Also, in case the blade guard 20 is fixed, the second cutting tool is pivoted in order to cut the brisket and/or the throat in step 6.

According to the present invention, there is also provided a method of cutting a carcass of a slaughtered animal.

In some implementations, the method first includes extending a first cutting tool towards the carcass. In some other implementations, the first cutting tool is fixed on the support assembly which is moved towards the carcass and this first step is not necessary.

The method then comprises moving the first cutting tool along a first path extending adjacent to a first portion of the carcass to process the first portion of the carcass with the extended first cutting tool. In some implementations, the first portion of the carcass includes a pubic bone of the carcass.

The method then includes retracting the first cutting tool away and disengaged from the carcass after the first portion has been processed, thereby exposing a second cutting tool, which may be fixed. In some implementation, the first cutting tool is fixed, and a retractable second cutting tool is therefore extended towards the carcass.

The method further comprises moving the second cutting tool along a second path extending adjacent to a second portion of the carcass to process the second portion of the carcass. The second portion includes an abdominal wall of the carcass. The abdominal wall comprises at least one of a belly portion, a brisket portion and a throat portion of the carcass.

In some implementations, the second cutting tool is retractable and the method further comprises the step of retracting the second cutting tool away and disengaged from the carcass after the second portion has been processed.

The first and the second cutting tools can be extended along a linear axis, a circular path or a combination thereof. The linear axis extends substantially perpendicular to a longitudinal length of the carcass.

In some implementations, the step of moving the second cutting tool also comprises partially shielding the second cutting tool using a blade guard, then pulling and tensioning the abdominal wall while the second cutting tool processes the belly portion of the carcass. The method then further comprises exposing the cutting tool by partially rotating the blade guard or by pivoting the second cutting tool, in order to process at least the brisket and throat portion of the carcass.

In some implementations, extending and/or moving the first cutting tool is realized independently and separately from extending and/or moving the second cutting tool.

In some implementations, optional steps can be added to the method. For example, the method may also comprise cleaning the first cutting tool upon after being retracted, or after the second cutting tool is extended, and during operation of the second cutting tool.

The method may further comprise cleaning the second cutting tool 18 during operation of the first cutting tool 16, and/or shielding the second cutting tool 18 during operation of the first cutting tool 16.

The system and method according to the present invention offers several advantages with respect to prior art systems. Firstly, there is hygiene improvement, as the two different tools are in operation in two sequences and thereby one tool can be washed while the other is in operation.

Moreover, the system uses two different individual tools, where washing can be sequenced between two different operations. Combined tools such as the one disclosed in WO 2014025250 require changing of the combined tool for washing.

In addition, the system has a weight advantage compared to other concepts that require carrying two combined tools. Such heavier systems generally need more power to be operated, and they are slower, larger and more expensive because of the presence of multiple combined tools.

The system according to the present invention is thus faster, cheaper to purchase or manufacture, requires lower energy consumption, lower maintenance time, lower maintenance costs and decreases the risk of injuries during such maintenance.

Moreover, systems with combined tools have more parts, are more expensive to operate and more difficult to maintain, and also include more cutting tools that have to be removed at the end of a working day, thus increasing the risk of injuries for system operators. Therefore, using such system with combined tools increases the potential downtime as there is a higher risk that a tool needs to be replaced.

The system and method also provide an optimization of cycle time because the pubic cutter finishes the cut while it retracts, the robot or manipulator system waits a few milliseconds for a start point and the circular saw can then begin the cut. There is a very small distance between the cleaving blade (or pubic cutter or knife) exit point and the rotatable cutting blade (circular saw) starting point, which is near the guiding finger.

The system and method also provide improved hygiene because the "time from cut to cleaning" is reduced, especially for the pubic cutter. In prior art systems, the tools are cleaned after a complete cycle while with the present system and method, the time to clean is much less than a cycle.

For example for systems that process 466 pigs/h, a complete cycle is 7.7 seconds. The time "from cut to cleaning" with the present invention is much less than 1 second for each tool.

The scope of the claims should not be limited by the preferred embodiments set forth in the examples, but should be given the broadest interpretation consistent with the description as a whole.

The invention claimed is:

1. A system for cutting a carcass of a slaughtered animal, the system comprising:
a support assembly mountable to a manipulator system, the support assembly being movable by the manipulator system along a first path extending adjacent to a first portion of the carcass and a second path extending adjacent to a second portion of the carcass;
a retractable assembly mounted to the support assembly and selectively movable between an extended configuration towards the carcass when the support assembly is being moved along one of the first or second paths and a retracted configuration away and disengaged from the carcass when the support assembly is being moved along the other one of the first or second paths;
one of a first or a second cutting tools mounted to the retractable assembly and configured to process one of the first or second portions of the carcass when the retractable assembly is in the extended position and the support assembly is being moved along one of the first or second paths and configured to disengage from the carcass when the retractable assembly is in the retracted position; the other one of the first or second cutting tool mounted to the support assembly and configured to process the other one of the first and second portions of the carcass when the support assembly is being moved along the other one of the first and second paths, wherein the first cutting tool is independently and separately movable relatively to movement of the second cutting tool;

a first cleaning tool, configured to clean the first cutting tool during operation of the second cutting tool, wherein the first cleaning tool is fixed or retractable relatively to the support assembly; and a second cleaning tool configured to clean the second cutting tool during operation of the first cutting tool, wherein the second cleaning tool is fixed or retractable relatively to the support assembly;

wherein at least one of the first or second cleaning tools is rotatably or linearly movable between a cleaning position towards a corresponding one of the first or second cutting tools and a processing position disengaged from said corresponding one of the first or second cutting tools, wherein the at least one of the first or second cleaning tools is configured to clean said corresponding one of the first or second cutting tool upon positioning in the cleaning position during operation of the other one of the first or second cutting tools.

2. The system according to claim 1, wherein the other one of the first and second cutting tools is mounted to the support assembly through an additional retractable assembly, the additional retractable assembly being selectively movable between a retracted configuration away and disengaged from the carcass when the support assembly is being moved along one of the first or second path and an extended configuration towards the carcass when the support assembly is being moved along the other one of the first and second paths.

3. The system according to claim 2, wherein the retractable assembly, the additional retractable assembly, or both the retractable assembly, the additional retractable assembly is/are movable along a linear axis, a circular path or a combination thereof, the linear axis extending substantially perpendicular to a longitudinal length of the carcass.

4. The system according to claim 2, wherein the first portion of the carcass includes a pubic bone of the carcass and the second portion includes an abdominal wall, the abdominal wall comprising at least one of a belly portion, a brisket portion and throat portion of the carcass, and wherein the first cutting tool is configured to cut the first portion, and the second cutting tool is configured to cut the second portion.

5. The system according to claim 1, wherein the retractable assembly is movable along a linear axis, a circular path or a combination thereof, the linear axis extending substantially perpendicular to a longitudinal length of the carcass.

6. The system according to claim 1, wherein the first portion of the carcass includes a pubic bone of the carcass and the second portion includes an abdominal wall, the abdominal wall comprising at least one of a belly portion, a brisket portion and throat portion of the carcass, and wherein the first cutting tool is configured to cut the first portion, and the second cutting tool is configured to cut the second portion.

7. The system according to claim 1, wherein the first cutting tool is a cleaving blade and the second cutting tool is a rotatable cutting blade.

8. The system according to claim 7, further comprising a blade guard partially covering the rotatable cutting blade, wherein the blade guard is movable or fixed relatively to the rotatable cutting blade.

9. The system according to claim 8, further comprising a guiding finger extending from an end portion of the blade guard and towards the carcass, the guiding finger being configured to slide along and behind the abdominal wall during operation of the rotatable cutting blade, the guiding finger extending tangentially or with an angle relatively to the end portion of the blade guard.

10. A method according to cutting a carcass of a slaughtered animal, the method comprising:

extending a first cutting tool towards the carcass;

moving the first cutting tool along a first path extending adjacent to a first portion of the carcass to process the first portion of the carcass with the extended first cutting tool;

retracting the first cutting tool away and disengaged from the carcass after the first portion has been processed; and moving a second cutting tool along a second path extending adjacent to a second portion of the carcass to process the second portion of the carcass, wherein the first cutting tool is extendable independently and separately relatively to movement of the second cutting tool, and wherein the method further comprises cleaning at least one of the first and second cutting tools after being retracted, and during operation of the other one of the first and second cutting tools.

11. The method according to claim 10, further comprising the steps of:

extending the second cutting tool towards the carcass before processing the second portion; and retracting the second cutting tool away and disengaged from the carcass after the second portion has been processed.

12. The method according to claim 11, wherein the first cutting tool is extended along a linear axis, a circular path or a combination thereof, the linear axis extending substantially perpendicular to a longitudinal length of the carcass.

13. The method according to claim 11, further comprising shielding the second cutting tool during operation of the first cutting tool.

14. The method according to claim 10, wherein the first cutting tool is extended along a linear axis, a circular path or a combination thereof, the linear axis extending substantially perpendicular to a longitudinal length of the carcass.

15. The method according to claim 10, further comprising shielding the second cutting tool during operation of the first cutting tool.

* * * * *